UNITED STATES PATENT OFFICE.

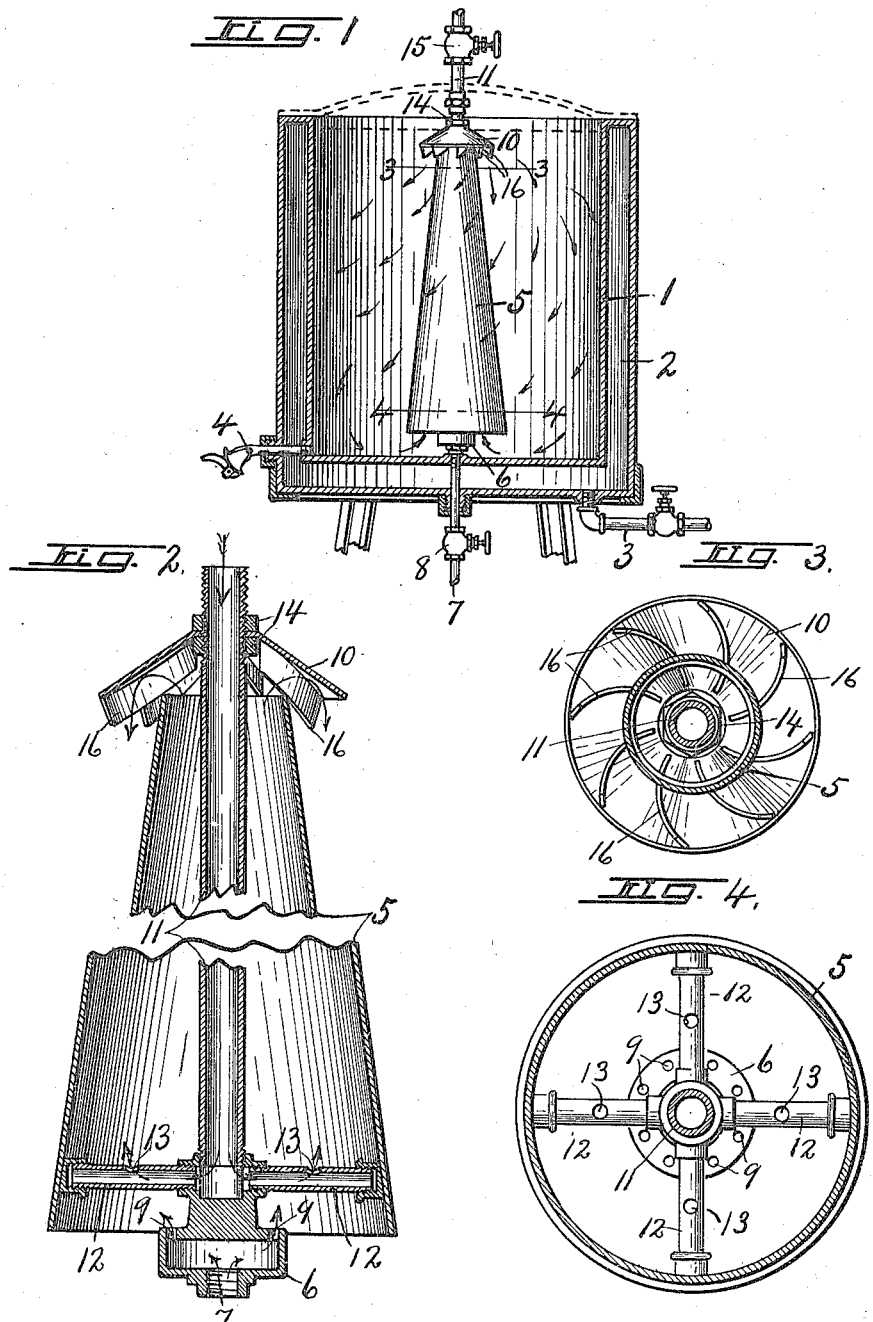

CHARLES A. TYLER, OF AUBURN, NEW YORK, ASSIGNOR TO NATIONAL CHEMICAL COMPANY, OF SYRACUSE, NEW YORK, A CORPORATION OF NEW YORK.

APPARATUS FOR TREATING STARCH.

1,190,690.     Specification of Letters Patent.     Patented July 11, 1916.

Application filed August 22, 1914. Serial No. 858,064.

*To all whom it may concern:*

Be it known that I, CHARLES A. TYLER, a citizen of the United States, and resident of Auburn, in the county of Cayuga, in the State of New York, have invented new and useful Improvements in Apparatus for Treating Starch, of which the following, taken in connection with the accompanying drawings, is a full, clear, and exact description.

This invention relates to certain improvements in apparatus for preparing laundrying starch as used for carrying out the process forming the subject of my co-pending application Serial No. 858,063, filed August 22, 1914, now issued in Letters Patent No. 1,157,738, whereby the raw starch is simultaneously agitated and cooked to reduce it to the desired consistency and the cooked starch further agitated and cooled to a predetermined temperature for present or future use.

The main object is to provide simple means for expeditiously and economically producing cold starch of more uniform consistency and greater efficiency than has heretofore been practised.

It is well known among laundrymen that cold starch reduced to the proper consistency is more economical in handling, less liable to deterioration and produces better results in the articles to which it is applied than what is commonly known as hot starch but owing to the difficulties heretofore experienced in producing cold starch of the desired consistency its use has been very limited owing primarily to the lack of knowledge on the part of the user of the requirements for treating it. It is also well known that apparatus in which the cold starch is used is more easily cleansed by washing with hot or cold water than that in which hot starch is used.

Another object, therefore, is to place within the hands of the user a simple device whereby he may prepare his own cold starch with the assurance that it will be of the proper grade or consistency.

Other objects and uses will be brought out in the following descriptions:

In the drawings: Figure 1 is a vertical sectional view of a starch-containing vat with my improved heater, mixer and cooler therein. Fig. 2 is an enlarged vertical sectional view, partly broken away, of a detached heater, mixer and cooler. Figs. 3 and 4 are horizontal sectional views taken on lines 3—3 and 4—4, Fig. 1, Fig. 3 being inverted to show the under side of the baffle cone.

The raw starch is placed in a suitable tank or container —1— and surrounded by a steam jacket —2— to which steam is supplied from any available source through a pipe —3— for the purpose of heating and facilitating the cooking of the starch in the tank —1—, the latter being provided with an outlet —4— for drawing off the contents of the vat.

The invention, however, consists in introducing a heating agent as steam directly into the starch in such manner as to break up the entire body into finely divided particles thereby effecting a uniform and rapid cooking of the starch during which operation a relatively small amount of raw starch may be added to that in the vat to bring the entire body to the desired consistency whereupon the supply of heating fluid may be shut off and the body of the starch subjected to further agitation and cooling by means of a cooling agent as air under pressure. For this purpose a conical shell —5— is placed in an upright position centrally within the starch container —1— with its lower end supported on the bottom thereof by means of a hollow steam receiving chamber —6— which is connected to a steam supply pipe —7— extending through the bottom of the container —1— and jacket —2—, said pipe being provided with a valve —8— for cutting off the supply of steam when necessary.

The chamber —6— constitutes a steam distributing head in close proximity to the lower open end of the conical shell —5— and provided in its upper end with apertures —9— discharging directly into said shell. The upper smaller end of the shell —1— extends to a point in proximity to the top of the starch-container —1— and is open for the passage of steam therethrough which steam impinges against the under side of the superposed baffle cone —10— overhanging the upper end of the cone —5— in close proximity thereto but of greater diameter than the small end of the cone —5— so as to deflect the steam and any starch which may be carried thereby from the bottom to the top of the cone —5—, downwardly around the outside of the cone, it being understood that the lower end as well as the main body of the cone —5— is immersed in the starch in the vat —1—.

It is apparent from the foregoing description that as long as the valve —8— is open a continuous current of steam will pass into and through the cone —5— and starch which may be embraced within its circumference and that this current of steam will convey a part of the starch with it against the baffle cone —10— thus producing a continuous circulation of the starch through the cone and a thorough agitation of the starch in the vat for the purpose of breaking up such starch with the steam and also by contact of the starch with the heated walls of the cone —5— and at —1—. While this cooking operation is in progress extra raw starch may be added to that in the vat to be cooked by the same process until the entire body is brought to the desired consistency.

When the cooking operation is completed and the starch brought to the desired consistency, the valve —8— is closed to shut off the supply of steam to the cone —5— and a similar valve in the pipe —3— is also closed to shut off the supply of steam to the jacket —2— whereupon the cooling agent as atmospheric air is introduced under pressure through the same cone —5— to further agitate and break up the mass of starch. To this end the cone —5— is provided with a centrally vertical tube —11— having its lower end secured to the head —6— but is cut off from communication with the distributing chamber in said head, the latter being provided with a plurality of, in this instance four, radial pipes —12— having their outer ends secured to the inner walls of the cone —5— near the lower end thereof and their intermediate portions provided with apertures —13— in their upper sides communicating with the interior of the main cone. The pipe —11— extends through and some distance beyond the upper end of the cone —5— and forms a convenient support of the baffle cone —10— which is held in place by lock nuts —14—. The pipe —11— and its branches —12— serve to convey a cooling agent as atmospheric air under pressure into the interior of the cone —5— from the lower end thereof upwardly and for this purpose its upper end may be connected to any available source of air supply under pressure and is provided with a valve —15— which is normally closed during the cooking operation and is only open when the steam valve —8— is closed at the end of such operation to admit air through the pipe —11— and its branches —12— into the interior of cone —5— whence it passes upwardly against the under side of the baffle cone —10— and is thereby deflected downwardly around the outside of the cone to agitate the starch and circulate it through the cone to further break it up into fine particles and to effect rapid cooling thereof. In order that the starch may be agitated as much as possible the baffle cone —10— is provided on its under side with a series of vanes or wings —16— curved in the same direction from the center toward the periphery to impart to the current of steam or air together with the starch a whirling motion with its vortex at the apexes of the cones. When the entire body of starch is cooled uniformly to the desired temperature, the air valve —15— is closed thereby allowing the starch to assume a condition of rest ready for present or future use.

What I claim is:

1. In an apparatus for treating laundrying starch, a starch container, an upright conical shell therein open at both ends, a conical baffle plate directly over the upper end of the shell, and means for projecting steam through the shell and against the baffle plate for breaking up the starch into fine particles and cooking the same, said baffle plate having a series of vanes on its underside curved in the same direction.

2. In an apparatus for treating laundrying starch, a starch container, an upright shell therein open at both ends, means for projecting steam into the lower end of the shell for agitating and cooking the starch, and separate means for projecting relatively cool air into the lower end of the shell for agitating and cooling the starch.

3. In an apparatus for treating laundrying starch, a starch container, an upright conical shell therein open at both ends, a steam receiving head having outlets discharging into the lower end of the shell, an air receiving pipe extending from the top downwardly into the shell below the starch level and provided with openings discharging upwardly into said shell, and a conical baffle plate directly over the upper end of the shell.

4. In an apparatus of the class described, a tank, a tubular shell open at both ends vertically arranged therein and having its lower end positioned adjacent the bottom of the tank, a steam receiving head discharging into the lower end of the shell, and additional means for discharging air into the shell adjacent its lower end.

5. In an apparatus of the class described, a tank, a tubular shell open at both ends vertically arranged therein and having its lower end positioned adjacent the bottom of the tank, a steam receiving head discharging into the lower end of the shell, and a series of radially extending pipes within the shell and positioned near its lower end and having openings for discharging air into the shell.

6. In an apparatus of the class described, a tank, a tubular shell open at both ends vertically arranged therein and having its lower end positioned adjacent the bottom of the tank, a steam receiving head discharging into the lower end of the shell, and a series of radially extending pipes connected to a common vertically disposed inlet pipe within the shell and positioned near its lower end and having openings for discharging air into the shell.

7. In an apparatus of the character described, a tank, an upright tubular shell arranged therein, a steam receiving head having an outlet discharging into the lower end of the shell, an air receiving pipe extending from the top downwardly into the shell, a series of radially extending pipes communicating with the downwardly extending pipe and positioned adjacent the lower end of the shell and provided with openings discharging into the shell.

8. In an apparatus of the character described, a tank, an upright tubular shell arranged therein, a steam receiving head having an outlet discharging into the lower end of the shell, an air receiving pipe extending downwardly into the shell, a series of radially extending pipes communicating with the downwardly extending pipe and positioned adjacent the lower end of the shell and provided with openings discharging into the shell, and a baffle plate carried by said downwardly extending pipe and positioned adjacent the upper end of the shell.

In witness whereof I have hereunto set my hand this 18th day of August, 1914.

CHARLES A. TYLER.

Witnesses:
E. A. THOMPSON,
VIOLA HOWLAND.

Copies of this patent may be obtained for five cents each, by addressing the "Commissioner of Patents, Washington, D. C."